US011641340B2

(12) United States Patent
Lumbatis

(10) Patent No.: US 11,641,340 B2
(45) Date of Patent: May 2, 2023

(54) GENERATION OF A UNIQUE DEVICE IDENTIFIER FOR A CLIENT DEVICE IN A WIRELESS NETWORK

(71) Applicant: ARRIS Enterprises LLC, Suwanee, GA (US)

(72) Inventor: Kurt A. Lumbatis, Dacula, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/734,228

(22) Filed: May 2, 2022

(65) Prior Publication Data

US 2022/0368670 A1 Nov. 17, 2022

Related U.S. Application Data

(60) Provisional application No. 63/189,320, filed on May 17, 2021.

(51) Int. Cl.
*G06F 15/16* (2006.01)
*H04L 61/50* (2022.01)

(52) U.S. Cl.
CPC .................................. *H04L 61/50* (2022.05)

(58) Field of Classification Search
CPC . H04L 61/50; H04L 63/0407; H04L 63/0876; H04W 12/02; H04W 12/69

USPC .................................................. 709/203, 245
See application file for complete search history.

(56) References Cited

U.S. PATENT DOCUMENTS

| 9,544,161 | B2 * | 1/2017 | Park | H04W 48/16 |
| 10,057,813 | B1 * | 8/2018 | Likar | H04L 63/0846 |
| 2004/0064591 | A1 * | 4/2004 | Noble | H04W 48/18 |
| | | | | 709/250 |
| 2018/0367539 | A1 * | 12/2018 | Huang | H04L 63/0846 |

* cited by examiner

*Primary Examiner* — Duyen M Doan
(74) *Attorney, Agent, or Firm* — Wenderoth, Lind & Ponack, L.L.P.

(57) ABSTRACT

To improve the network experience in a network, a unique device identifier (UDID) can be generated by a UDID generation module of a client device. The UDID generation module utilizes one or more device parameters as well as a service set identifier (SSID) as input(s) to the UDID generation module. The UDID can be reported to an access point device of the network so that the access point device can track, monitor, control, etc. the client device within the network, for example, when media access control randomization (rMAC) is utilized by the network to protect the privacy of the client device or a user of the client device. The same UDID is generated each time the client device joins the network so that the client device need not store the UDID.

20 Claims, 6 Drawing Sheets

| Device Parameters ||
|---|---|
| Device Parameter ID | Device Parameter Value |
| Model Name | <string_value1> |
| Model Number | <string_value2> |
| Serial Number | <string_value3> |
| SSID | <string_value4> |

*302*

| SSID Seed Value | <first phase hash output value> |
|---|---|

GENERATION OF A UNIQUE DEVICE IDENTIFIER FOR A CLIENT DEVICE IN A WIRELESS NETWORK

BACKGROUND

Wireless networks (for example, WLAN (wireless local area network) or Wi-Fi (wireless fidelity) networks) are increasingly adopting randomized or changing media access control address (RCM) or randomized media access control (rMAC) addresses. This poses a problem for many parts of the wireless network infrastructure that may use a media access control (MAC) address of a client device (such as a wireless device) as a unique identifier for the client device so as to track or otherwise identify general attributes, settings, properties, and/or behaviors of or associated with the client device, such as parental controls set for the client device or as part of a network configuration. Different users may have different expectations or requirements for privacy. Some users may prioritize privacy above other considerations. For example, an end user in a public area may not wish to allow their presence to be tracked, while an end user in a trusted network environment may see value in allowing a device to be recognized and tracked so that other features, such as parental controls, can operate as expected. Therefore, there is a need to provide a unique device identifier for a client device when it is desired that a client device be recognized by the network.

SUMMARY

According to aspects of the present disclosure, a unique device identifier (UDID) is generated by a client device such that the client device can be recognized by a network when connected with the network. Based on a configuration or setting, the client device can generate a UDID. For example, the client device can determine that a UDID should be generated based on any of one or more UDID association parameters read from a memory of the client device, selected by a user of the client device, received from a network device, any other instruction, request, or indication received by the client device, or a combination thereof. The UDID is unique to a given network and is retained and utilized only within the given network. The UDID can be reported to the access point of the given network to which the client device is associated but is not reported outside of this network. In this way, the client device can be tracked by the network and historical as well as current data can be associated with the client device so as to provide an improved quality of service (QoS) and/or quality of experience (QoE).

An aspect of the present disclosure is drawn to a method for a client device within a network to generate a UDID. The method comprises associating the client device with a service set identifier (SSID) supplied by an access point device within the network, determining to generate a UDID based on one or more association parameters, generating the UDID, wherein generating the UDID comprises: receiving by a hash module a plurality of first inputs, wherein the plurality of first inputs comprises the SSID and one or more device parameters, generating by the hash module an SSID seed value based on the plurality of first inputs, receiving by the hash module a plurality of second inputs, wherein the plurality of second inputs comprises the SSID seed value and a client device identity, and receiving by the hash module a plurality of second inputs, wherein the plurality of second inputs comprises the SSID seed value and a client device identity, and reporting the UDID to the access point device, for example, via a UDID report message.

In an aspect of the present disclosure, the method further comprises combining at least a plurality of the one or more device parameters to generate the client device identity.

In an aspect of the present disclosure, the method is such that the hash module comprises a hash-based message authentication code (HMAC)-SHA-256.

In an aspect of the present disclosure, the method further comprises receiving an action frame exchange from the access point device, and wherein the reporting the UDID response is based on the action frame exchange.

In an aspect of the present disclosure, the method is such that the determining to generate the UDID comprises determining that the network is a private network or a trusted network.

In an aspect of the present disclosure, the method is such that the UDID reported to the access point device in the UDID report message comprises a portion of the UDID.

In an aspect of the present disclosure, the method is such that the portion of the UDID is based on an offset value.

An aspect of the present disclosure is drawn to a client device for generating a UDID. The client device comprises a memory storing one or more computer-readable instructions, and a process connected to the memory. The process is configured to execute the one or more computer-readable instructions to associate the client device with a service set identifier (SSID) supplied by an access point device within the network, determine to generate a UDID based on one or more association parameters, generate the UDID, wherein generating the UDID comprises: receiving by a hash module a plurality of first inputs, wherein the plurality of first inputs comprises the SSID and one or more device parameters, generating by the hash module an SSID seed value based on the plurality of first inputs, receiving by the hash module a plurality of second inputs, wherein the plurality of second inputs comprises the SSID seed value and a client device identity, and generating by the hash module the UDID based on the plurality of second inputs, and report a UDID report message to the access point device of the network, wherein the UDID report message comprises the UDID.

In an aspect of the present disclosure, the processor is further configured to execute the one or more instructions to combine at least a plurality of the one or more device parameters to generate the client device identity.

In an aspect of the present disclosure, the hash module comprises a hash-based message authentication code (HMAC)-SHA-256.

In an aspect of the present disclosure, the processor is further configured to execute the one or more instructions to receive an action frame exchange from the access point device, and wherein the reporting the UDID report message is based on the action frame exchange.

In an aspect of the present disclosure, the determining to generate the UDID comprises determining that the network is a private network or a trusted network.

In an aspect of the present disclosure, the UDID reported to the access point device in the UDID report message comprises a portion of the UDID.

In an aspect of the present disclosure, the portion of the UDID is based on an offset value.

An aspect of the present disclosure provides a non-transitory computer-readable medium of a client device storing one or more computer-readable instructions for generating a UDID. The one or more instructions when executed by a processor of the client device, cause the client device to perform one or more operations including the steps of the methods described herein.

BRIEF DESCRIPTION OF THE DRAWINGS

FIG. 7 is a diagram illustrating exemplary inputs for a hash module, according to one or more aspects of the present disclosure.

Like reference numbers and designations in the various drawings indicate like elements.

DETAILED DESCRIPTION

With the advent of MAC randomization (rMAC and/or RCM) in Wi-Fi networks to protect the identify of a user, there is a need for generating a unique device identifier (UDID) for a client device that is outside of the MAC address. The UDID is utilized for a client device (also referred to as a station (STA)) within a network such that each client device can be any of tracked, monitored, controlled, remembered, otherwise handled, or any combination thereof by one or more network components or devices, such as an access point device to which the client device is associated. Methods, systems, and computer readable medium/media can facilitate using a UDID generation module to generate a UDID for any one or more client devices in the network. When a client device joins, connects, or otherwise associates with the network, the client device can generate a UDID. The client device is not required to store the UDID as the client device generates the same UDID each time the client device associates with the network. The client device reports the UDID to the access point device that can retain the UDID. The access point device only utilizes the UDID within the network and control system inherent with the extended service set (ESS) or basic service set (BSS). For example, the UDID is only valid within the ESS. The UDID is unique for a given client device within a given network. In this way, the client device can be known to the network, for example, an access point device of the network, each time the client device associates with the network without any user intervention so that the client device and/or the user has an improved network experience, quality of service (QoS), and/or quality of experience (QoE).

Described herein is an addition of a new feature, for example, to the IEEE 802.11 standard that explicitly provides for the generation of a UDID for a client device for reporting to an access point device. The UDID is the same each time the client device associates with the network such that the client device is known to the network.

Figure 1:
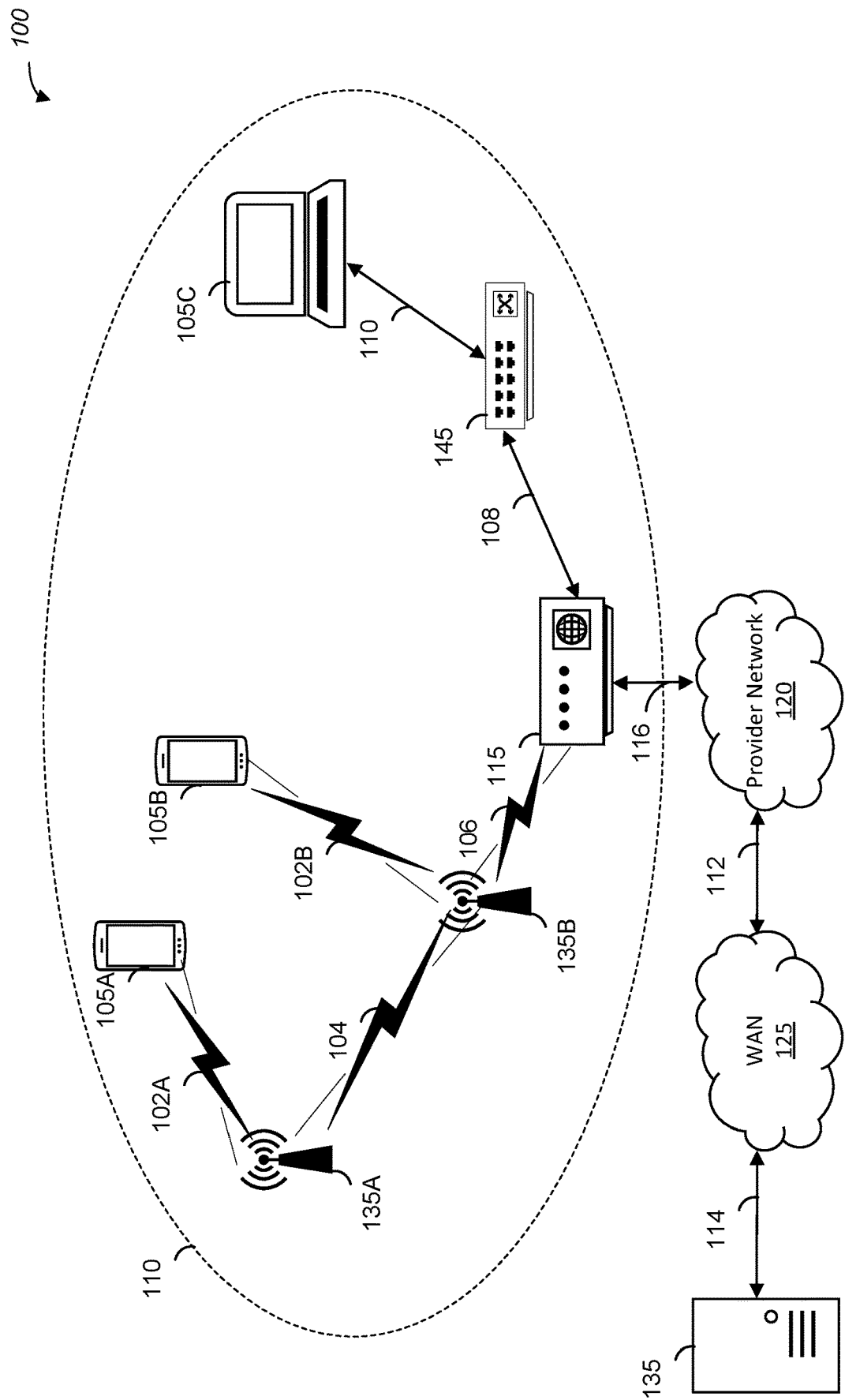
FIG. 1 is a diagram of a network environment, according to one or more aspects of the present disclosure.

FIG. 1 is a diagram of a network environment 100, according to one or more aspects of the present disclosure. The network environment 100 comprises an access point device 115, a network switch 145, one or more extender access point devices 135 (for example, extender access point devices 135A and 135B), one or more client devices 105 (for example, one or more client devices 105A, 105B, and 105C), a provider network 120, a wireless area network 125, and a server 125. In one or more embodiments, a client device 105 can be a station (STA) as defined in, for example, the 802.11-2016 Specification. The one or more client devices 105 can be any type of network device that connects to an access point device 115, an extender access point device 135, or both, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth (BT), or other wireless hand-held consumer electronic devices capable of executing and displaying content received through the access point device 115. Additionally, the one or more client devices 105 can be a television (TV), an IP/QAM set-top box (STB) or a streaming media decoder (SMD) that is capable of decoding audio/video content, and playing over-the-top (OTT) or multiple system operator (MSO) provided content received via the access point device 115.

A client device 105C can be connected to the access point device 115 via a wired connection 110 that connects the client device 105C to a network switch 145 that is connected to the access point device 115 via a wired connection 108. The client device 105C may not require generation of a UDID as the client device 105C is a wired device that generally is not portable and/or not repeatedly disconnected and reconnected to the network. Client devices 105A and 105B can connect to the access point device 115 via wireless connections 102A and 102B (collectively referred to as wireless connection(s) 102), respectively, to extender access point devices 135A and 135B, respectively.

A plurality of services may be delivered to one or more client devices 105 over one or more local networks 110. The local network(s) 110 may include a wireless local area network (WLAN), personal area network (PAN), mobile hotspot network, any other network, or any combination thereof. The local network 110 may be provided at a subscriber premise by an access point 115. An access point 115 may be, for example, a CPE (customer premise equipment) device and may include any device configured to facilitate communications between a WAN 125 and one or more client devices 105, such as a modem, an optical network unit (ONU), an optical network terminal (ONT), multimedia terminal adapter (MTA), embedded MTA (EMTA), gateway device, router, network extender, or other access device. An access point device 115 may be integrated with one or more other devices. For example, an access point device 115 may include a broadband access modem (for example, a modem may reside within a gateway device, STB, and/or one or more other devices). The access point device 115 can offer wired LAN network access, wireless LAN network access, or some other physical layer access for the one or more client devices 105 to gain higher level network access through the access point device 115.

It should be understood that delivery of the plurality of services over the local network(s) 110 may be accomplished using any one or more standards and formats. It will be appreciated by those skilled in the relevant art that one or more client devices 105 may be capable of interacting and communicating with each other and/or with an access point device 115 over various wireless communication standards (for example, Wi-Fi, Bluetooth, etc.).

An access point 115 can be connected to a broadband access network or provider network 120 via a connection 116 and can route communications between one or more client devices 105 and the WAN 125 through the connection 112 and/or the server 135 through the connect 114 that connects to the server 135 to the WAN 125 to the broadband access network 120. The broadband access network or provider network 120 can be a wired or wireless network.

In general, and according to wireless communication standards, a client device 105 can probe for a new network if the client device 105 is not currently connected. Typically, the probe messages contain, among other fields, a MAC (media access control) address for the client device 105. A coordinated network may track movements of an end user by tracking the probe messages received at different access points/access point devices 115 if the network has knowledge of the MAC address of the end user's device. The access point device 115 can be configured to provide various features such as parental controls, device steering, and others depending upon the ability of the access point device 115 to consistently identify a station 105 across association events. Additionally, infrastructure systems may use past behavior to provide improved steering and other services to a station 105, which would not be available if the station 105 cannot be recognized when it returns to the infrastructure ESS (extended service set)/BSS (basic service set). However, a client device 105 can disconnect from the network 110 and rejoin the network 110 at a later time making it difficult if not impossible for the access point device 115 to track the habits, uses, priorities, etc. and/or provide the features and/or services expected by a user of the client device 105 as the MAC address will be different the next time the client device 105 rejoins the network 110, for example due to randomization of the MAC address. Thus, having the client device 105 generate a UDID and report the UDID to the access point device 115 allows the access point device 115 to provide an improved overall network experience associated with the client device 105. For example, parental control settings are generally based on a MAC address and will not function properly when using rMAC and/or RCM. By generating and reporting the UDID, the client device 105 is provided with applicable network services according to the configuration of the network.

To allow flexibility, a secured communication exchange (for example, an action frame exchange) is utilized to allow an access point device 115 to request a UDID from a client device 105. The communication exchange may include a UDID request that is output from the access point device 115, and received by a client device 105, and a UDID report message that is transmitted or reported from the client device 105 to the access point device 115, in response to the UDID request. An access point device 115 may enforce different policies against a client device 105 depending upon the UDID report message from the client device 105. The communication exchange between the access point device 115 and the client device 105 may be secured and kept private. The UDID request and UDID report message can be wireless communications (for example, wireless communications per a IEEE 802.11 standard).

In one or more embodiments, a UDID report message may include an indication that the client device 105 is providing the access point device 115 with a UDID. For example, the client device 105 may be configured to determine whether to provide a UDID based on one or more association parameters, such as the type of network and/or encryption provided by the access point device 115. The UDID report message can include any of an identification of a length of the UDID to be associated with the client device 105, the UDID that is to be associated with the client device 105, one or more manufacturer specific parameters 105, any other information associated with the client device 105, or any combination thereof. The access point device 115 can store the contents of the UDID report message in a memory of the access point device, for example, a memory as discussed with respect to FIG. 2, a network or cloud resource, such as a server 135, or both. For example, the access point device 115 can maintain a database mapping of the UDID of the client device 105 and the MAC address of the client device 105 currently in use for the particular network session so as to monitor and/or control the client device 105 in the network 110.

The connections 106, 104, and/or 102 corresponding to any of the access point device 115, the one or more wireless extender access point devices 135, and client devices 105 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz band, 5 GHz band, 6 GHz band, or 60 GHz band. Additionally, the connections 104 and/or 106 can be implemented using a wireless connection that operates in accordance with, but is not limited to, RF4CE protocol, ZigBee protocol, Z-Wave protocol, IEEE 802.15.4 protocol, any other protocol, or any combination thereof. It is also contemplated by the present disclosure that the connections 104 and 106 can include connections to a media over coax (MoCA) network. One or more of the connections 104 and 106 can also be a wired Ethernet connection. Any one or more of the connections 104 and 106 can carry information on any of one or more channels of a frequency band that are available for use.

The extender access point devices 135 can be, for example, wireless hardware electronic devices such as access points, extenders, repeaters, etc. used to extend the wireless network by receiving the signals transmitted by the access point device 115 and rebroadcasting the signals to, for example, client devices 105, which may out of range of the access point device 115. The extender access point devices 135 can also receive signals from the one or more client devices 105 and rebroadcast the signals to the access point device 115 and/or or other client devices 105.

During a first association between an access point device 115 and a client device 105, the access point device 115 is authorized to permanently store the UDID received from client device 105, the access point device 115 may continue to store and/or use the UDID for the station 105. After the first association has ended, and during a second or subsequent association between the client device 105 and the access point device 115, the client device 105 may be using a different identifier (for example, an rMAC) than one that was used by the client device 105 during the first association between the access point device 115 and the client device 105. However, during the second or subsequent association, the client device 105 generates the same UDID that was sent to the access point device 115 during the first association. In response, the access point device 115 can use authorization(s) and/or behaviors, and/or enable one or more services or features that were used and/or enabled during a previous association between the access point device 115 and the client device 105. During the second or subsequent associations between the access point device 115 and the client device 105, the access point device 115 may use these authorization(s) and/or permissions, and/or enable these services or features without requesting corresponding authorization(s) and/or permission(s) from the client device 105 during the second/subsequent association(s) between the access point device 115 and the client device 105.

Figure 2:
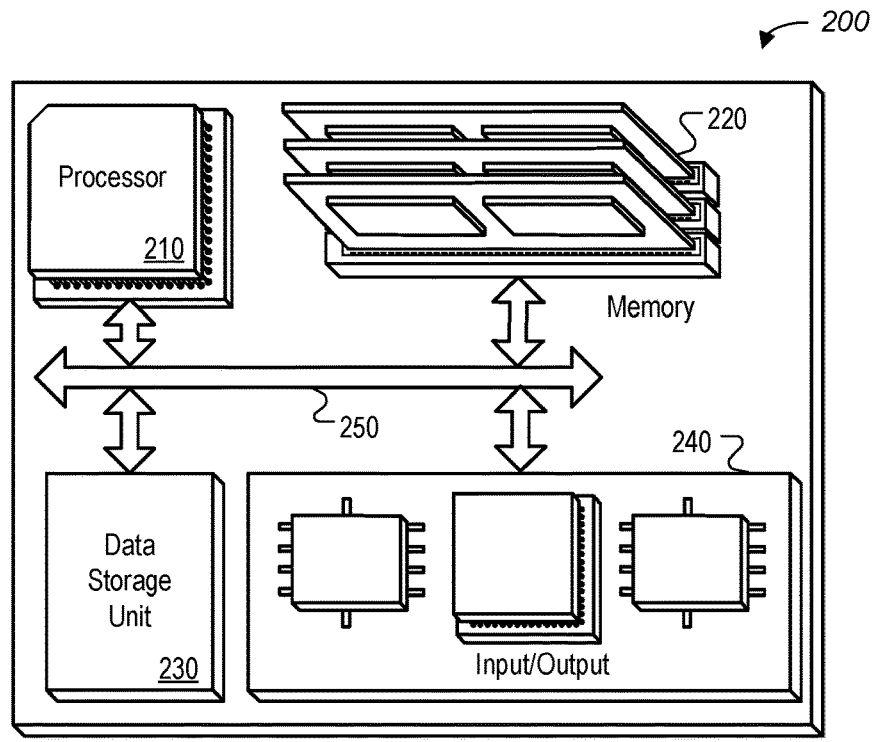
FIG. 2 is a block diagram of a hardware configuration for one or more devices, according to one or more aspects of the present disclosure.

FIG. 2 is a block diagram of a hardware configuration 200 for one or more devices within a network environment 100, for example, for a client device 105 to generate a UDID, an access point device 115 to establish communication one or more other devices and/or to manage the network 110, an extender access point device 135 to route traffic from a client device 105 to an access point device 115, any other network requirement by a device, or any combination thereof, according to one or more aspects of the present disclosure. The hardware configuration 200 can comprise a processor 210, a memory 220, a storage device or data storage unit 230, and an input/output (I/O) device 240. Each of the components 210, 220, 230, and 240 can, for example, be interconnected using a system bus 250. The processor 210 can be capable of processing instructions for execution within the hardware configuration 200. In one implementation, the processor 210 can be a single-threaded processor. In one or more embodiments, the processor 210 can be a multi-threaded processor. The processor 210 can be capable of processing instructions stored in the memory 220 or on the storage device 230.

The memory 220 can store information within the hardware configuration 200. In one implementation, the memory 220 can be a computer-readable medium. In one implementation, the memory 220 can be a volatile memory unit. In another implementation, the memory 220 can be a non-volatile memory unit.

In some implementations, the storage device 230 can be capable of providing mass storage for the hardware configuration 200. In one implementation, the storage device 230 can be a computer-readable medium. In various different implementations, the storage device 230 can, for example, include a hard disk device, an optical disk device, flash memory or some other large capacity storage device. In other implementations, the storage device 230 can be a device external to the hardware configuration 200.

The I/O device 240 provides I/O operations for the hardware configuration 200. In one implementation, the I/O device 240 can include one or more of a network interface device (for example, an Ethernet card), a serial communication device (for example, an RS-232 port), one or more universal serial bus (USB) interfaces (for example, a USB 2.0 port), one or more wireless interface devices (for example, an 802.11 card) for outputting video, voice, and/or data services to a client device 105 of FIG. 1 (for example, television, STB, computer, mobile device, tablet, telephone, wearable, etc.). In embodiments, the I/O device 240 can include one or more driver devices configured to send communications to, and receive communications from one or more networks (for example, local network 110 of FIG. 1, broadband access network 120 of FIG. 1, WAN 125 of FIG. 1, server 135 of FIG. 1, etc.).

Figure 3:
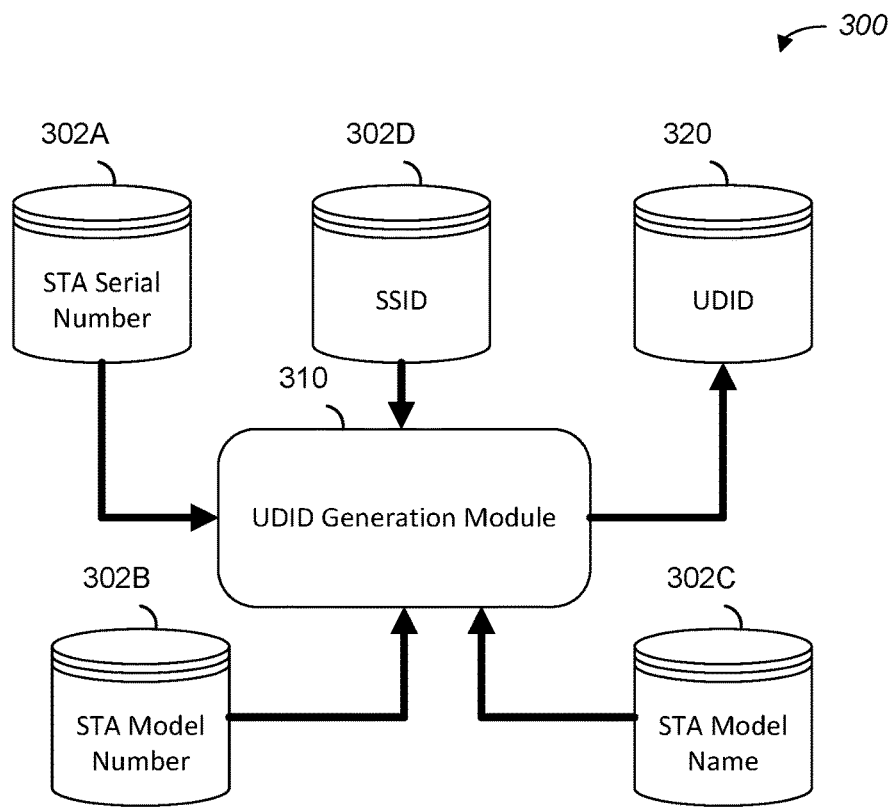
FIG. 3 is a block diagram of a UDID generation system, according to one or more aspects of the present disclosure.

FIG. 3 is a block diagram of a UDID generation system 300, according to one or more aspects of the present disclosure. FIG. 3 illustrates a plurality of inputs to a UDID generation module 310 of the UDID generation system 300 of a client device 105 which generates the UDID 320 associated with the client device 105 for a given network. The UDID generation module system 300 can include circuitry and/or processing to accomplish the generation of the UDID 320 as discussed herein, for example, with respect to FIG. 2. The UDID generation module 310 can be implemented via the execution of software or a program in the form of one or more computer-readable instructions stored on a memory device, such as memory 220, by a controller or processor, such as processor 210. For example, a client device 105 can include a combination of hardware and software programmed to generate the UDID 320 that is unique to a network 110. However, the described method does not preclude the use of a hardware block (for example, various logic gates) by the UDID generation module 310.

The UDID generation module 310 can receive one or more device parameters 302, for example, any of a serial number 302A, a model number 302B, a model name 302C, an SSID 302D, a date of manufacture, a MAC address, a software version, any other device parameter, or any combination thereof. For example, FIG. 7 illustrates one or more device parameters 302 for use by the UDID generation module 310. The UDID generation module 310 can output a UDID 320 based on the one or more device parameters along with other information as discussed with reference to FIGS. 4-8.

Figure 4:
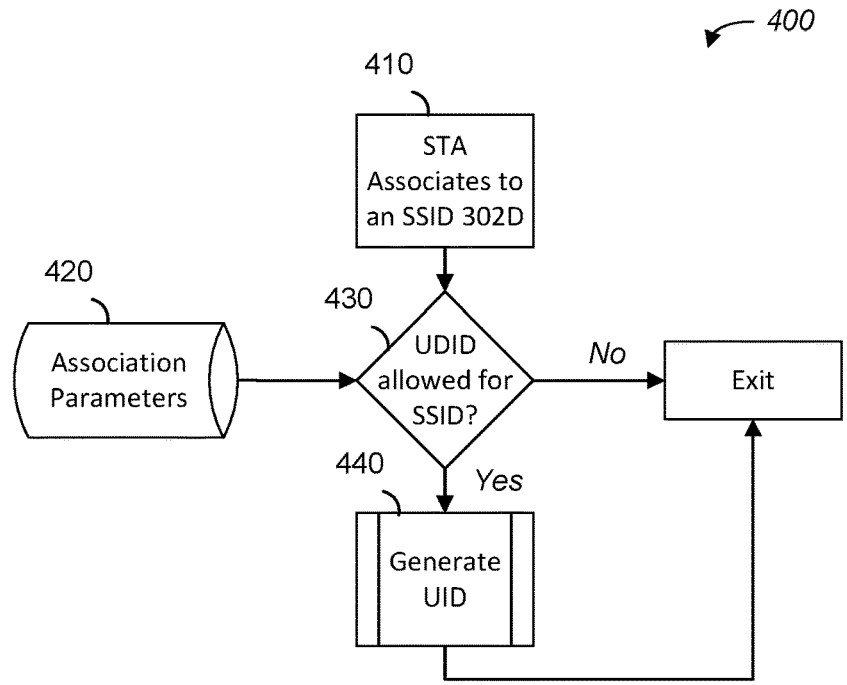
FIG. 4 is a flowchart for a method to determine to generate a UDID, according to one or more aspects of the present disclosure.

FIG. 4 is a flowchart for a method 400 to determine to generate a UDID 320 by a UDID generation module 310 of a client device 105, according to one or more aspects of the present disclosure. A client device 105 can implement the method 400 to determine whether a UDID should be generated by the client device 105 for reporting to the access point device 115 of a network. At step 410, a client device 105 associates to an SSID 302D as provided or supplied by the access point device 115. For example, when the client device 105 joins a network 110, an access point device 115 can assign or supply an SSID 302D for the client device 105.

At step 430, the UDID generation module 310 can determine whether a UDID should be generated, for example, based on one or more association parameters 420, such as any of the SSID 302D, a voice input, a type of network (such as a public network, a hotspot, a trusted network, and/or a private network), a type of encryption (such as WPA, WPA2, WPA3, open system, network authentication (such as any IEEE 802.1x version authentication), a pre-shared key, any other type of encryption, or a combination thereof), an SSID associated with the network, any other information and/or setting, or any combination thereof. For example, the UDID generation module 310 can determine that the network is a private network and that a UDID 320 should be generated or that the network is a public network and that a UDID 320 should not be generated. Any of the one or more association parameters 420 can be stored locally at the client device 105, remotely (such as at a server 135, or both), or both.

In one or more embodiments, the client device 105 executes step 430 by reading from a configuration file and/or variable, a settings file and/or variable, any other type of data, or any combination thereof whether stored locally or remotely. For example, the client device 105 can determine that a setting indicates that the UDID 320 should or should not be generated. In one or more embodiments, a user, and administrator, any other person or entity with certain privileges, or any combination thereof, can configure the client device 105 to generate or not generate a UDID 320, for example, based on the one or more association parameters. In one or more embodiments, once a network is selected by the client device 105 (such as a user selecting a network to join from a list of available networks), a prompt is presented requesting entry of the type of network selected to join (such as any of a dialog box, one or more check boxes, a drop-down list or list box, any other type of user interface, or a combination thereof). Based on the entry, the access point device 115 can determine whether to send an action frame exchange to request the UDID 320 or a UDID report message that comprises the UDID 320 to the client device 105, the client device 105 can determine whether to generate the UDID 320, or both.

Figure 5:
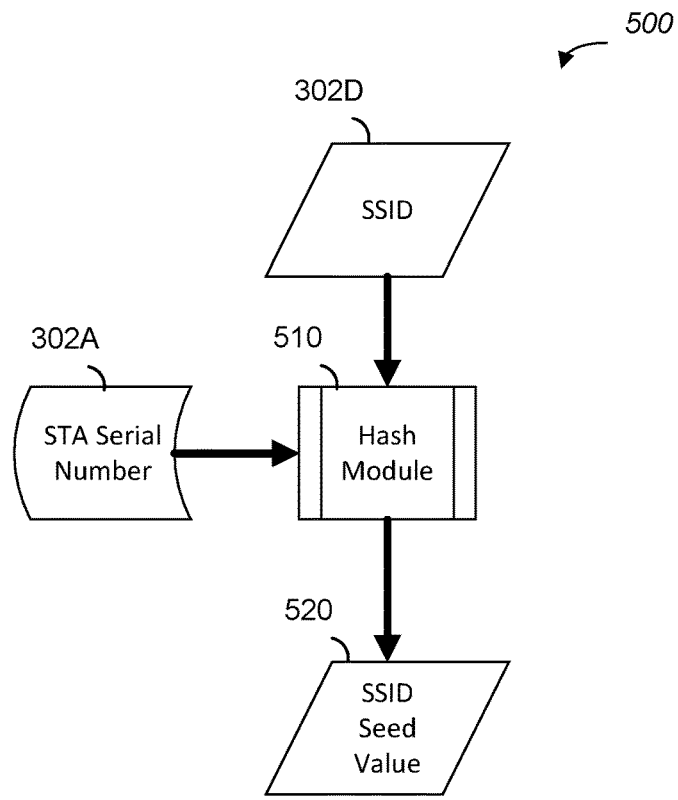
FIG. 5 is a diagram for generating a service set identifier (SSID) seed value by a first phase of a hash module, according to one or more aspects of the present disclosure.

FIG. 5 is a diagram for generating a service set identifier (SSID) seed value 520 by a first phase of a hash module 510, according to one or more aspects of the present disclosure. In a first phase of the UDID generation, the hash module 510 receives a plurality of first inputs, for example, an SSID 302D with which the client device 105 is associated and a serial number 302A associated with the client device 105. The hash module 510 generates a SSID seed value 520 based on the plurality of first inputs 302D and 302A. For example, FIG. 7 illustrates an SSID seed value 520 generated by the first phase of the hash module 510. The generation of the SSID seed value 520 can be used as a randomization input to a second phase of the UDID generation as discussed with reference to FIG. 6. The serial number 302A can be utilized as a secret key supplied to the hash module 510. In one or more embodiments, the hash module 510 comprises a hash-based message authentication code (HMAC)-SHA-256 function, any other cryptographic function, or both.

Figure 6:
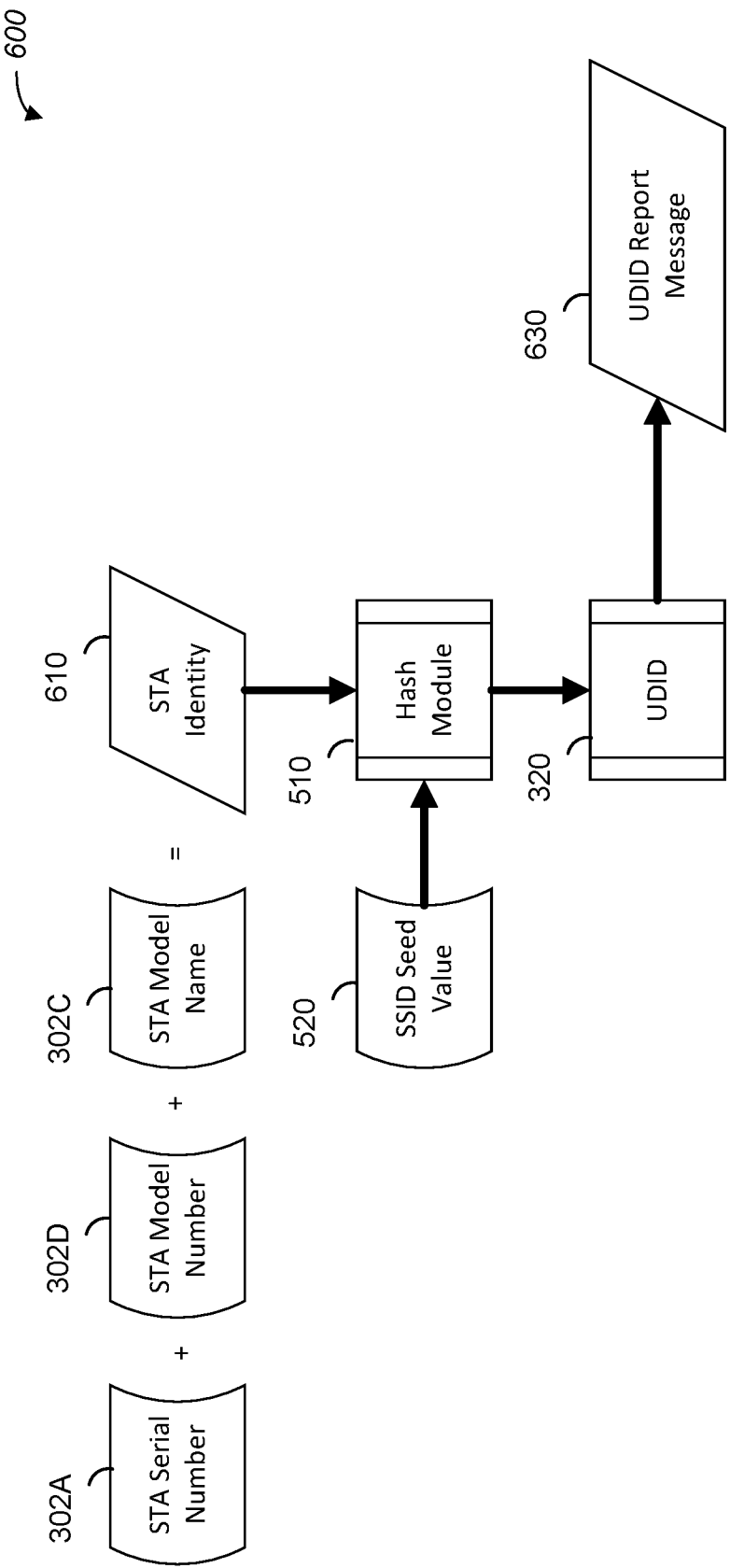
FIG. 6 is a diagram for generating a UDID for a client device in a network by a second phase of a hash module, according to one or more aspects of the present disclosure.

FIG. 6 is a diagram for generating a UDID 320 for a client device 105 in a network by a second phase of a hash module 510, according to one or more aspects of the present disclosure. A client device or STA identity 610 is determined or generated by the client device 105. For example, the UDID generation module 310 aggregates, concatenates, or otherwise combines a plurality of one or more device parameters 302 associated with the client device 105 to generate the client device identity 610. For example, FIG. 7 illustrates one or more device parameters 302 for use by the UDID generation module 310 to generate the client device identity 610. The one or more device parameters 302 can be combined in any repeatable way, such as by appending one to another, using any logical operator, any other repeatable function, or any combination thereof. The second phase of the hash module 510 receives a plurality of second inputs. For example, the plurality of second inputs can comprise the client device identity 610 and the SSID seed value 520. Based on the plurality of second inputs (for example, the client identity 610 and the SSID seed value 520), the hash module 510 generates a UDID 320 associated with the client device 105 for use by the access point device 115. The client device 105 can send a UDID report message 630 to the access point device 115 that comprises the UDID 320 to report the UDID 320 to the access point device 115.

In one or more embodiments, the UDID report message 630, such as a UDID response from the client device 105 that is sent or transmitted in response to a UDID request from an access point device 115, can comprise a portion of the UDID 320 generated by the hash module 510. For example, the UDID reported can be a certain number of bits of the UDID 320 generated by the hash module 510. In one or more embodiments, the UDID report message 630 can comprise a number of bits of the UDID 320 generated by the hash module 510 based on an offset value so as to generate a portion of the UDID 320 generated by the hash module 510 for reporting to the access point device 115. The offset value serves as an index into the generated UDID 320 indicating the location of the data to utilize as the base of the UDID 320 to be reported to the access point device 115. For example, the offset value can indicate a start bit place, an end bit place, or both.

Figure 8:
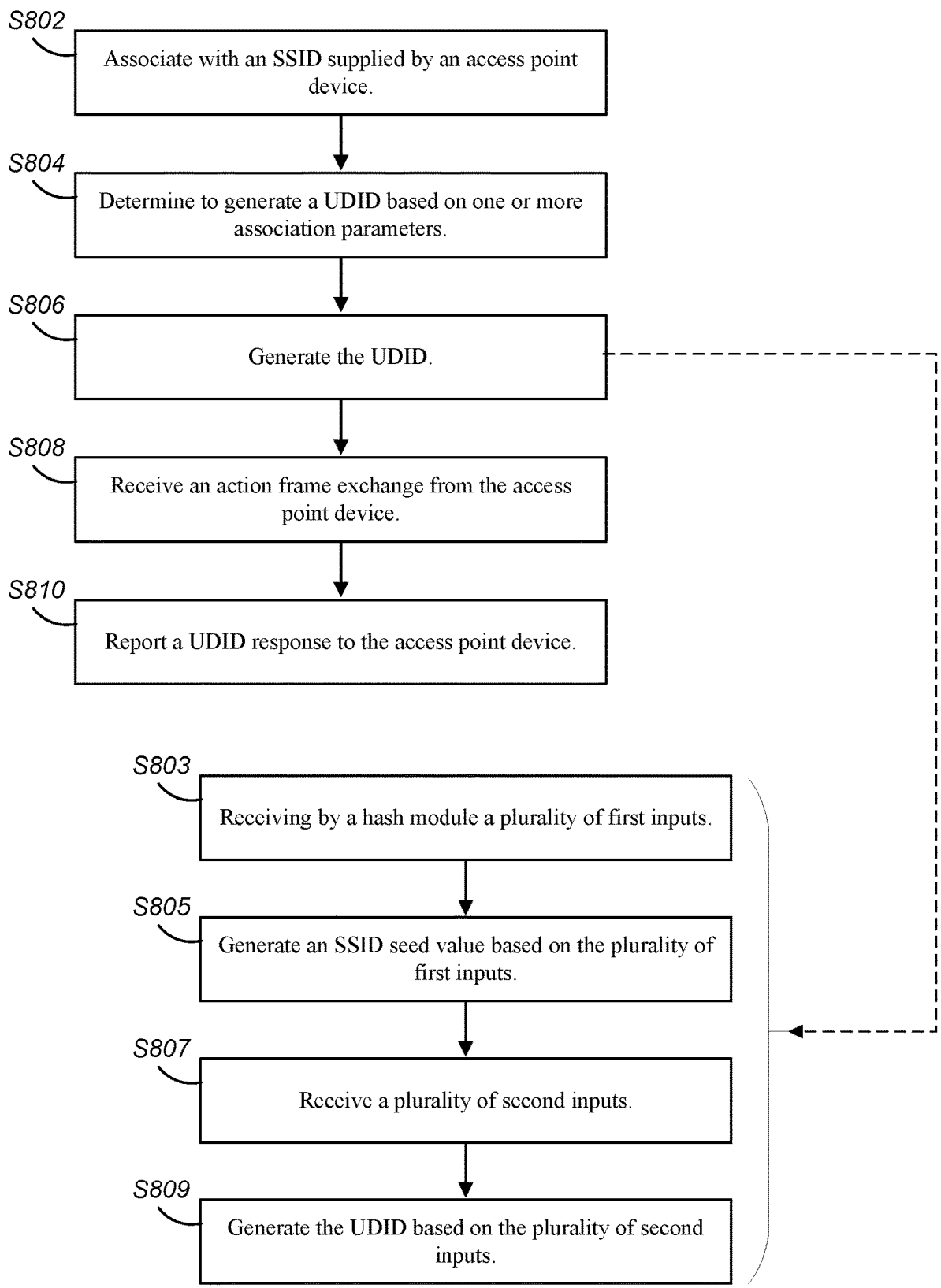
FIG. 8 is a flowchart for a method of reporting a generated UDID of a client device to an access point device of a network, according to one or more aspects of the present disclosure.

FIG. 8 is a flowchart for a method of reporting a generated UDID 320 of a client device 105 to an access point device 115 of a network, according to one or more aspects of the present disclosure. In one or more embodiments, a client device may include a processor 210 that can be programmed with or to execute one or more to perform steps for generating a UDID 320 for reporting, in whole or in part, to an access point device 115. In FIG. 8, it is assumed that the devices include their respective controllers and/or processors and their respective software stored in their respective memories, as discussed above in reference to FIGS. 1-7, which when executed by their respective controllers perform one or more functions or operations in accordance with the example embodiments of the present disclosure.

The processor 210 executes one or more computer-readable instructions, stored in a memory, for example, a memory 220 of a client device 105, that when executed perform one or more of the operations of steps S802-S810. In one or more embodiments, the one or more instructions may be one or more software applications. While the steps S802-S810 are presented in a certain order, the present disclosure contemplates that any one or more steps can be performed simultaneously, substantially simultaneously, repeatedly, in any order or not at all (omitted).

At step S802, a client device 105 is associated with an SSID 302D supplied by an access point device 115 within a network, for example, a network 110 within a network environment 100. For example, the client device 105 can be a portable wireless device that is new to the network or reintroduced to the network. When the client device 105 requests to join the network, the access point device 115 can supply the client device 105 with an SSID.

At step S804, the client device 105 determines to generate a UDID 320 based on one or more association parameters 420. For example, the client device 105 can determine that the network is a private network such that a UDID 320 should be generated. In one or more embodiments, the determination at step S804 can be based on a user input. For example, a user can select or configure the client device 105 such that a UDID 320 is generated by the client device 105 for use by the network. In one or more embodiments, the determination at S804 to generate a UDID 320 can be forced by, for example, an administrator such that any association parameters 420 associated with the device or any other parameters and/or criteria or overridden.

At step S806, the client device 105 generates the UDID 320. For example, a UDID generation module 310 can comprise one or more computer-readable instructions stored in a memory 220 that when executed by a processor 210 cause the client device 105 to generate a UDID 320. Generating the UDID can comprise at step S803 receiving by a hash module 510 a plurality of first inputs, wherein the plurality of first inputs comprises the SSID 302D and one or more device parameters 320. The hash module 510 can be part of or external to the UDID generation module 310. At step S805, the hash module 510 can generate an SSID seed value 520 based on the plurality of first inputs. At step S807, the hash module 510 can then receive a plurality of second inputs, wherein the plurality of second inputs comprises the SSID seed value 520 and a client device identity 610. The client device identity 610 can be generated by combining at least a plurality of the one or more device parameters associated with the client device 105. At step S809, the hash module 510 generates the UDID 320 based on the plurality of second inputs as an output from the hash module 510.

At step S808, the client device 105 receives an action frame exchange from the access point device 115. At step S810, the client device 105 reports a UDID report message 630 to the access point device 115 of the network, for example, based on the action frame exchange of step S808. The UDID report message 630 comprises the UDID 320. For example, the UDID report message 630 can comprise all or a portion (for example, based on an offset value) of the UDID 320 generated in step S806.

Those skilled in the art will appreciate that the invention improves upon methods and systems for handling unique identifiers for stations. Methods, systems, and computer readable media can be operable to facilitate an exchange of messages between an access point and a station, wherein the access point requests a unique identifier from the station. The station may either respond with a message declining to provide a unique identifier or respond with a message including a unique identifier to be used by the access point for the station. The response from the station may include additional limitations on the use of the unique identifier by the access point. The access point may enforce different policies against a station depending upon how the station responds to the unique identifier request.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method for a client device within a network to generate a unique device identifier (UDID), the method comprising:
    associating the client device with a service set identifier (SSID) supplied by an access point device within the network;
    determining to generate the UDID based on one or more association parameters; generating the UDID, wherein generating the UDID comprises:

receiving by a hash module a plurality of first inputs, wherein the plurality of first inputs comprises the SSID and one or more device parameters;

generating by the hash module a SSID seed value based on the plurality of first inputs;

receiving by the hash module a plurality of second inputs, wherein the plurality of second inputs comprises the SSID seed value and a client device identity; and generating by the hash module the UDID based on the plurality of second inputs; and reporting a UDID report message to the access point device of the network, wherein the UDID report message comprises the UDID.

2. The method of claim 1, further comprising:

combining at least a plurality of the one or more device parameters to generate the client device identity.

3. The method of claim 1, wherein the hash module comprises a hash-based message authentication code (HMAC)-SHA-256.

4. The method of claim 1, further comprising:

receiving an action frame exchange from the access point device; and wherein the reporting the UDID report message is based on the action frame exchange.

5. The method of claim 1, wherein the determining to generate the UDID comprises determining that the network is a private network or a trusted network.

6. The method of claim 1, wherein the UDID reported to the access point device in the UDID report message comprises a portion of the UDID.

7. The method of claim 6, wherein the portion of the UDID is based on an offset value.

8. A client device for generating a unique device identifier (UDID), the client device comprises:

a memory storing one or more computer-readable instructions; and a processor connected to the memory, the processor configured to execute the one or more computer-readable instructions to:

associate the client device with a service set identifier (SSID) supplied by an access point device within the network;

determine to generate the UDID based on one or more association parameters;

generate the UDID, wherein generating the UDID comprises:

receiving by a hash module a plurality of first inputs, wherein the plurality of first inputs comprises the SSID and one or more device parameters;

generating by the hash module a SSID seed value based on the plurality of first inputs;

receiving by the hash module a plurality of second inputs, wherein the plurality of second inputs comprises the SSID seed value and a client device identity; and generating by the hash module the UDID based on the plurality of second inputs; and report a UDID report message to the access point device of the network, wherein the UDID report message comprises the UDID.

9. The client device of claim 8, wherein the processor is further configured to execute the one or more instructions to:

combine at least a plurality of the one or more device parameters to generate the client device identity.

10. The client device of claim 8, wherein the hash module comprises a hash-based message authentication code (HMAC)-SHA-256.

11. The client device of claim 8, wherein the processor is further configured to execute the one or more instructions to:

receive an action frame exchange from the access point device; and wherein the reporting the UDID report message is based on the action frame exchange.

12. The client device of claim 8, wherein the determining to generate the UDID comprises determining that the network is a private network or a trusted network.

13. The client device of claim 8, wherein the UDID reported to the access point device in the UDID report message comprises a portion of the UDID.

14. The client device of claim 13, wherein the portion of the UDID is based on an offset value.

15. A non-transitory computer readable medium of a client device having one or more computer-readable instructions stored thereon, that when executed by a processor cause the client device to perform one or more operations comprising:

associating the client device with a service set identifier (SSID) supplied by an access point device within the network;

determining to generate a unique device identifier (UDID) based on one or more association parameters;

generating the UDID, wherein generating the UDID comprises:

receiving by a hash module a plurality of first inputs, wherein the plurality of first inputs comprises the SSID and one or more device parameters;

generating by the hash module a SSID seed value based on the plurality of first inputs;

receiving by the hash module a plurality of second inputs, wherein the plurality of second inputs comprises the SSID seed value and a client device identity; and generating by the hash module the UDID based on the plurality of second inputs; and reporting a UDID report message to the access point device of the network, wherein the UDID report message comprises the UDID.

16. The non-transitory computer-readable medium of claim 15, wherein the one or more computer-readable instructions further cause the client device to perform one or more further operations comprising:

combining at least a plurality of the one or more device parameters to generate the client device identity.

17. The non-transitory computer-readable medium of claim 15, wherein the hash module comprises a hash-based message authentication code (HMAC)-SHA-256.

18. The non-transitory computer-readable medium of claim 15, wherein the one or more computer-readable instructions further cause the client device to perform one or more further operations comprising:

receiving an action frame exchange from the access point device; and wherein the reporting the UDID report message is based on the action frame exchange.

19. The non-transitory computer-readable medium of claim 15, wherein the determining to generate the UDID comprises determining that the network is a private network or a trusted network.

20. The non-transitory computer-readable medium of claim 15, wherein the UDID reported to the access point device in the UDID report message comprises a portion of the UDID.

* * * * *